United States Patent
Hanafusa et al.

(10) Patent No.: US 6,630,815 B2
(45) Date of Patent: *Oct. 7, 2003

(54) BATTERY PROTECTIVE CIRCUIT WITH CURRENT-AMOUNT CONTROL CIRCUIT

(75) Inventors: Kiyoshi Hanafusa, Hyogo (JP); Hiroichi Ishida, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/235,787

(22) Filed: Sep. 6, 2002

(65) Prior Publication Data

US 2003/0011345 A1 Jan. 16, 2003

Related U.S. Application Data

(63) Continuation of application No. 09/926,528, filed as application No. PCT/JP00/06794 on Sep. 29, 2000, now Pat. No. 6,462,515.

(30) Foreign Application Priority Data

Mar. 15, 2000 (JP) ........................................ 2000-072390

(51) Int. Cl.[7] .............................................. H01M 10/46
(52) U.S. Cl. ...................................................... 320/150
(58) Field of Search ................................ 320/127, 134, 320/135, 136, 137, 150, 153

(56) References Cited

U.S. PATENT DOCUMENTS 5,150,033 A   9/1992  Conway 6,462,515 B1 * 10/2002 Hanafusa et al.
2001/0043138 A1   11/2001 Furuta et al.

FOREIGN PATENT DOCUMENTS

| JP | 04-114402 | 4/1992 |
|---|---|---|
| JP | 4-328279 | 11/1992 |
| JP | 05-074493 | 3/1993 |
| JP | 6-349480 | 12/1994 |
| JP | 08-149701 | 6/1996 |
| JP | 10-172574 | 6/1998 |
| JP | 10-188947 | 7/1998 |
| JP | 10-509579 | 9/1998 |
| WO | WO 96/15563 | 5/1996 |

OTHER PUBLICATIONS

High–Density Lithium Secondary Battery, by Zenichiro Takehara, Japan, Kabushiki Kaisha Technosystem, Mar. 14, 1998, the first edition, pp. 271–275.

* cited by examiner

Primary Examiner—Edward H. Tso
(74) Attorney, Agent, or Firm—Oblon, Spivak, McClelland, Maier & Neustadt, P.C.

(57) ABSTRACT

A battery protective circuit which can ensure the safety and reliability of a rechargeable secondary battery is provided. Personal digital assistants include a main circuit (30) and a battery block (60). The battery block (60) includes a battery (20) and a current-amount control circuit (50). The battery (20) is charged via an AC adapter. The current-amount control circuit (50) includes a current and temperature detecting circuit (for example a PTC element) operative to reduce a current amount when an amount of current flowing in the battery (20) approaches a boundary value of a charge-guaranteed region in which the battery (20) is rechargeable.

3 Claims, 10 Drawing Sheets

BATTERY PROTECTIVE CIRCUIT WITH CURRENT-AMOUNT CONTROL CIRCUIT

TECHNICAL FIELD

The present invention relates to a battery protective circuit, and more particularly to a configuration for preventing a value of current flowing in a battery from exceeding a guaranteed current when a short or overcharge occurs.

BACKGROUND ART

Recently, personal digital assistants such as a portable telephone, a notebook-sized personal computer and a video camera are widely used. These personal digital assistants use a battery for supplying power. A rechargeable secondary battery is used for such a battery.

When current flowing in a battery increases for some reason (a short of an electric circuit or charge at an overvoltage and the like), the battery may generate excessive heat and possibly become degraded or damaged.

Therefore, these tools are conventionally equipped with a battery protective circuit for protecting the battery. An example of the battery protective circuit includes a PTC (Positive Temperature Coefficient) element and a thermal protector. The PTC element or the thermal protector serves as a current and temperature detecting circuit, operating in such a manner that electric resistance thereof increases as a larger current flows in the element and temperature becomes higher, and electric resistance thereof increases rapidly to suppress current when a certain temperature is reached. Further, a thermistor has its resistance value changed as an ambient temperature rises.

The conventional battery protective circuit, however, has a problem as described below. Referring to FIG. 12, the problem of the conventional battery protective circuit will be described.

With respect to FIG. 12, the ordinate and the abscissa respectively represent voltage and current. A represents a charge-guaranteed region in which a battery is rechargeable, and BZ represents a protection region in which a current and temperature detecting circuit such as a PTC element or a thermal protector is functional.

The charge-guaranteed region A represents a relation between current flowing in the battery and voltage across terminals of the battery. The protection region BZ represents a relation between current flowing in the PTC element or the like (and the battery) and voltage across terminals of the PTC element or the like.

The charge-guaranteed region A is a region in which the battery can protect itself, and the protection region BZ is a region in which the current and temperature detecting circuit is functional.

When the value of current flowing in the battery enters the protection region BZ for some reason, the internal resistance of the PTC element or the like increases. As a result, an amount of current flowing in the circuit decreases.

The conventional battery protective circuit has performed its protecting function when heavy current flows, regardless of the charge-guaranteed region A, as shown in FIG. 12.

Therefore, for the current value between the charge-guaranteed region A and the protection region BZ, any safety and reliability of the battery is not assured. Thus, unfortunately, for some types of batteries, the battery cannot protect itself, and in addition, the safety and reliability of a device operated by the battery cannot be assured.

Then, the present invention is made to solve the above mentioned problem, and its object is to provide a battery protective circuit which can ensure the safety and reliability of a rechargeable battery and a device operated by the battery.

DISCLOSURE OF THE INVENTION

According to an aspect, the present invention provides a battery protective circuit for a rechargeable battery, including a current-amount control circuit including a current and temperature detecting circuit provided near the battery, operative to detect a value of current flowing in the battery and an ambient temperature, and to decrease the current value when the current value and the ambient temperature reach a value of a protection region, wherein the minimum current value in the protection region is less than the maximum current value in the charge-guaranteed region in which the battery is rechargeable, and the maximum current value in the protection region is greater than the maximum current value in the charge-guaranteed region.

According to another aspect, the present invention provides a battery protective circuit for a rechargeable battery, including: a current-amount control circuit including a current and temperature detecting circuit provided near the battery, operative to detect a value of current flowing in the battery and an ambient temperature, and to decrease the current value when the current value and the ambient temperature reach a value of a first protection region; and an interconnection layer supplying current to be flown in the battery, including a meltable portion to be melted and cut off when the value of current flowing in the battery reaches a value of a second protection region. The minimum current value in the first protection region is less than the maximum current value in the charge-guaranteed region in which the battery is rechargeable, and the maximum current value in the first protection region is greater than the maximum current value in the charge-guaranteed region. The minimum current value in the second protection region is less than the maximum current value in the first protection region, and the minimum current value in the second protection region is greater than the maximum current value in the charge-guaranteed region. In the interconnection layer, the meltable portion has a relatively small cross sectional area, while a portion other than the meltable portion of the interconnection layer has a relatively large cross sectional area.

Preferably, at least two or more meltable portions of the interconnection layer are arranged.

The aforementioned battery protective circuit can decrease the current value before degradation and damage of the battery, even when the value of current flowing into the battery increases.

As a result, the battery can surely be protected, and the safety and reliability of the battery and the device operated by the battery can be improved.

Further, when the current amount approaches a boundary region of an operating condition of the current and temperature detecting circuit due to overcharge, charge in reverse direction or the like, the interconnection layer is melted and cut off at the time when the current-amount control circuit is not yet damaged, and therefore the current is interrupted.

Therefore, the undesirably high temperature of the battery can be prevented and the current-amount control circuit may not be burdened. As a result, the overall reliability and safety of the device including the battery and the current-amount control circuit can be improved.

According to a further aspect, the present invention provides a battery protective circuit for a rechargeable battery, including: a current-amount control circuit including a current and temperature detecting circuit provided near the battery, operative to detect a value of current flowing in the battery and an ambient temperature, and to decrease the current value when the current value and the ambient temperature reach a value of a first protection region; and an interconnection layer supplying current to be flown in the battery, including a meltable portion to be melted and cut off when the value of current flowing in the battery reaches a value of a second protection region. The minimum current value in the first protection region is less than the maximum current value in the charge-guaranteed region in which the battery is rechargeable, and the maximum current value in the first protection region is greater than the maximum current value in the charge-guaranteed region. The minimum current value in the second protection region is less than the maximum current value in the first protection region, and the minimum current value in the second protection region is greater than the maximum current value in the charge-guaranteed region. In the interconnection layer, the meltable portion has a relatively small cross sectional area, while a portion other than the meltable portion of the interconnection layer has a relatively large cross sectional area. In the interconnection layer, the greater the current value in the second protection, the shorter the time for the meltable portion be melted and cut off.

The aforementioned battery protective circuit can decrease the current value before degradation and damage of the battery, even when the value of current flowing into the battery increases, so that the battery can surely be protected, and in addition, the safety and reliability of the battery and the device operated by the battery can be improved. Furthermore, when the current amount approaches a boundary region of an operating condition of the current and temperature detecting circuit due to overcharge, charge in reverse direction or the like, the interconnection layer is melted and cut off at the time when the current-amount control circuit is not yet damaged, and the current is interrupted. Therefore, the undesirably high temperature of the battery can be prevented and the current-amount control circuit may not be burdened. As a result, the overall reliability and safety of the device including the battery and the current-amount control circuit can be improved. Further, as the current value in the second protection region becomes greater, the time for the meltable portion to be melted and cut off becomes shorter. Therefore, even when heavy current flows, the meltable portion is not melted and cut off, if the time of current flow is short enough. As a result, even when the terminal of the battery causes a momentary short-circuit, the meltable portion does not melt, if the moment is short enough. Therefore, a short circuit over such a short time that does not affect the safety may not result in a failure of the battery.

BEST MODES FOR CARRYING OUT THE INVENTION

Figure 1:
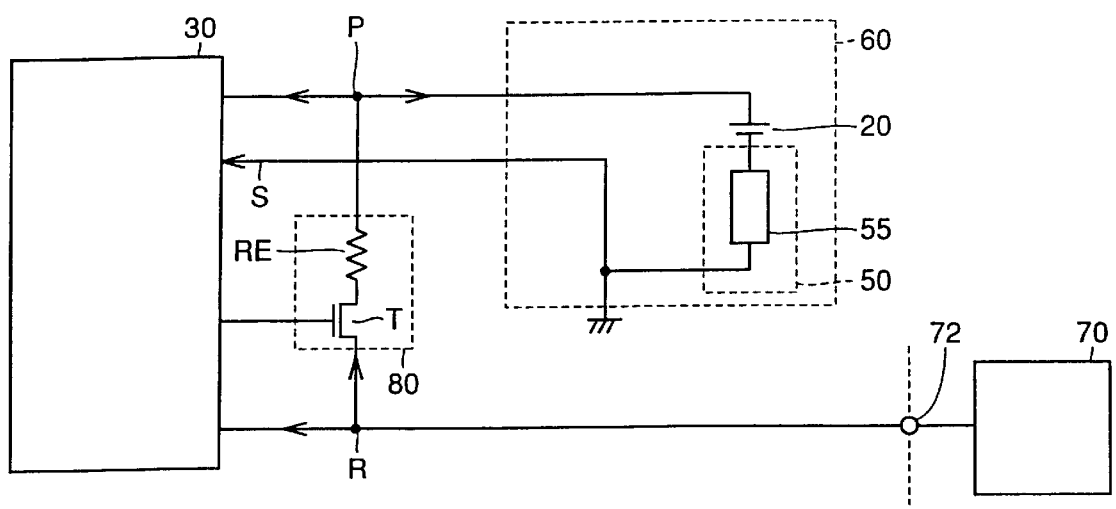
FIG. 1 is a diagram showing a configuration of a main portion of a portable telephone in accordance with a first embodiment.

Embodiments of the present invention will be described with reference to the figures. Note that the same or corresponding parts in the figures are denoted with the same reference characters and the description thereof is not repeated.

First Embodiment

Referring to FIG. 1, a configuration for battery protection in accordance with a first embodiment will be described. It is noted that in the following description, a portable telephone is taken as an example of a personal digital assistant for the purpose of illustration. FIG. 1 shows a configuration of a main portion of a portable telephone in accordance with the first embodiment.

Turning now to FIG. 1, the portable telephone includes a main circuit 30 including a processing circuit and the like for sending and receiving a signal, a battery block 60 for supplying electricity to main circuit 30, and a control circuit 80.

Battery block 60 includes a battery 20 and a current-amount control circuit 50 for protecting battery 20. When battery 20 is charged, an AC adapter 70 is connected to an AC adapter terminal 72. AC adapter terminal 72 is electrically connected to a node P, from which current flows into battery 20.

Battery block 60 is contained inside a housing for the portable telephone. Alternatively, it may be formed removable from the housing of the portable telephone.

Current-amount control circuit 50 is configured, for example, with a PTC element which is a current and temperature detecting circuit, a thermistor or the like which is a temperature sensing element, or a composite element thereof. The current and temperature detecting circuit as used herein refers to a PTC element, a thermal protector or the like, and it has a function of continuously detecting a current value and a temperature to control the value of current. It is noted that current is interrupted by the current and temperature detecting circuit when a certain value of current and temperature are reached. In FIG. 1, current-amount control circuit 50 is configured with PTC element 55. PTC element 55 is connected to the side of the negative terminal of battery 20.

Main circuit 30 is connected with node P. Main circuit 30 is configured with an electronic component including an interconnection, a resistance, a capacitor, a coil and the like, and it is operated by power supply from battery 20. Main circuit 30 can monitor a change in resistance value (signal S) of current-amount control circuit 50. For example, main circuit 30 can be configured to include a circuit for controlling the charge such that the voltage at node P can be kept constant by signal S.

Furthermore, main circuit 30 includes a circuit (such as a clock) operated by supply voltage received from node R, which is electrically connected to AC adapter terminal 72.

Control circuit 80 controls voltage and current which is supplied from AC adapter 70 to battery 20 and main circuit 30. Control circuit 80 includes a resistance element RE and a transistor T. Transistor T is connected between node R and one terminal of resistance element RE, the other terminal of which is connected to node P. Transistor T turns on in response to a control signal received from main circuit 30. The current and voltage for charging the battery is controlled under the control of control circuit 80.

PTC element 55 forming current-amount control circuit 50 gradually increases in electric resistance as the value of current flowing in the element increases and the ambient temperature increases. Then, when the current value and the ambient temperature exceed prescribed values, the resistance rapidly increases. Therefore, PTC element can operate to decrease the value of current flowing in battery 20 in response to the value of current flowing in battery 20 and the ambient temperature.

Figure 2:
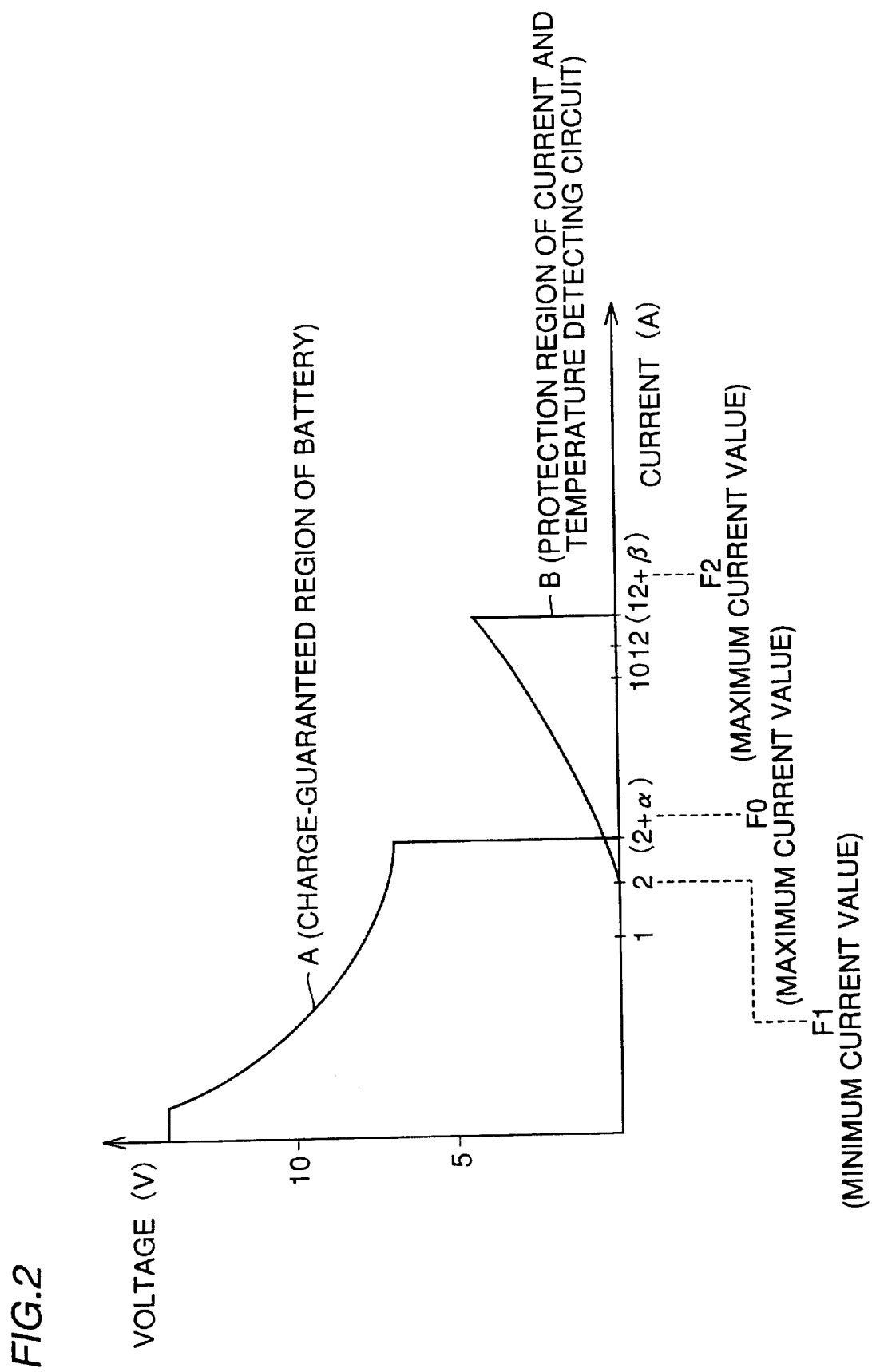
FIG. 2 is a graph illustrating a battery protective function by a current-amount control circuit 50 in accordance with the first embodiment.

Referring now to FIG. 2, the battery-protecting function by current-amount control circuit 50 in accordance with the first embodiment will be described. In FIG. 2, the ordinate and the abscissa respectively represent voltage and current, A represents a charge-guaranteed region in which the battery is rechargeable without damage, and B represents the protection region in which the current and temperature detecting circuit (PTC element 55) in accordance with the first embodiment is functional.

The charge-guaranteed region A is a region in which the battery is rechargeable without damage, that is, the battery can protect itself. Charge-guaranteed region A ranges from 0 ampere to F0 ampere. In the figure, F0 is about $(2+\alpha)$ amperes (the current value varies with battery rating).

The protection region B of the current and temperature detecting circuit is a region where the battery is protected. Protection region B ranges from the current value F1 to the current value F2. The current value F1 is included in a boundary region of charge-guaranteed region A. In the figure, F1 is about 2 amperes, and F2 is about $(12+\beta)$ amperes.

As the value of current flowing in battery 20 enters protection region B, the current and temperature detecting circuit operates to increase its resistance and decrease the current flowing into battery 20. At this point, the current and temperature detecting circuit performs its protecting function from the vicinity of boundary value of charge-guaranteed region A of battery 20. Therefore, when the value of current flowing in battery 20 gets close to the boundary value of charge-guaranteed region A, the value of current flowing into battery 20 can be shifted to charge-guaranteed region A.

As a result, degradation and damage of battery 20 can surely be prevented, and the overall safety and reliability of the device including the battery can be assured.

Figure 3:
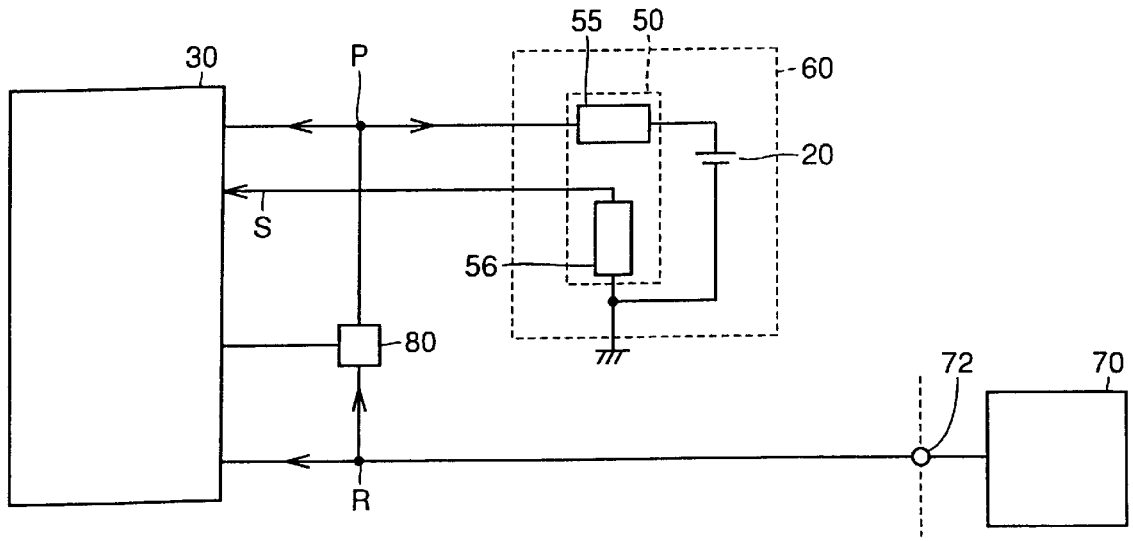
FIG. 3 is a diagram showing an exemplary configuration of the main portion of the portable telephone in accordance with the first embodiment.

Note that the configuration of current-amount control circuit 50 is not limited to the one shown in FIG. 1. As an example of current-amount control circuit 50, a thermal protector may be used. Further, as shown in FIG. 3, battery 20 may have its positive terminal connected to PTC element 55 and its negative terminal connected to a temperature sensing element 56, such as a thermistor.

Second Embodiment

A configuration for battery protection in accordance with a second embodiment will be now described. According to the second embodiment, an interconnection layer having a meltable portion to be melted and cut off in accordance with a current value is arranged in addition to the above mentioned current-amount control circuit 50, for battery 20.

Figure 4:
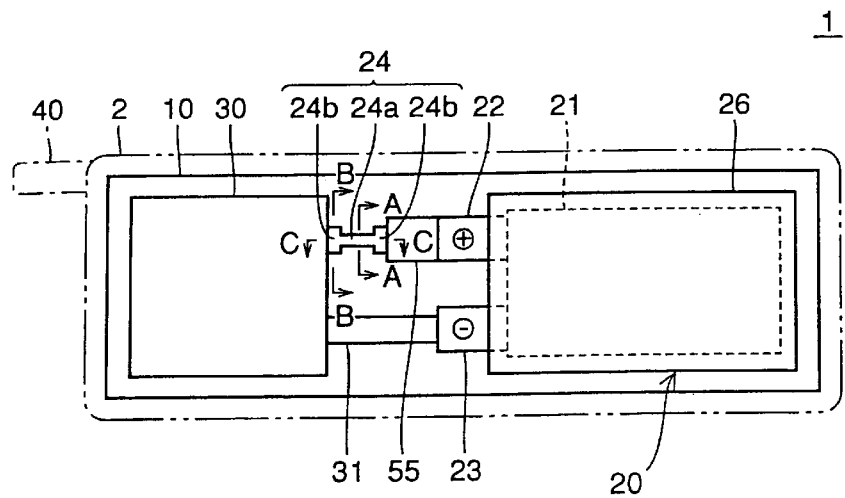
FIG. 4 is a diagram illustrating a structure of a main portion of a portable telephone 1 in accordance with a second embodiment.

FIG. 4 illustrates a structure of a main portion of a portable telephone in accordance with the second embodiment of the present invention. Referring to FIG. 4, a portable telephone 1 includes a housing 2, a printed board 10 as an insulating substrate, a main circuit 30, a battery 20 and an antenna 40. A large part of antenna 40 is accommodated in housing 2, and can be extended to protrude from housing 2 when portable telephone 1 is used.

Printed board 10 is fixed to housing 2. Main circuit 30 is provided on printed board 10. Main circuit 30 is supplied with electricity from battery 20.

Battery 20 is fixed to printed board 20. Battery 20 has a battery core 21 as a power generation element, an exterior member 26, a positive terminal 22 and a negative terminal 23. Positive terminal 22 and negative terminal 23 are electrically connected to battery core 21.

An interconnection layer 24 and PTC element 55 as a current-amount control circuit are also arranged on printed board 10. PTC element 55 and interconnection layer 24 are connected between positive terminal 22 and main circuit 30. An interconnection layer 31 is connected between negative terminal 23 and the main circuit.

Interconnection layer 24 is formed from copper. An interconnection portion 24b at both ends of interconnection layer 24 is formed to be relatively wide, and meltable portion 24a located at the center portion is formed to be relatively narrow.

Figure 5A:
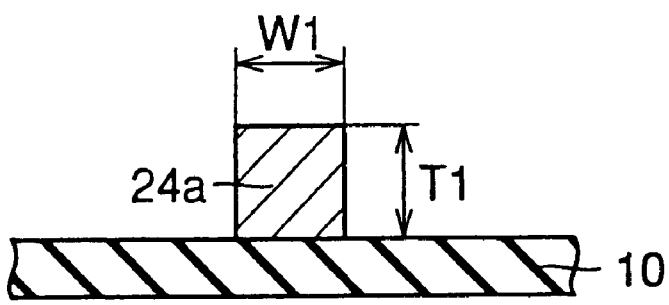
FIG. 5A is a cross sectional view illustrating a structure of an interconnection layer 24 in accordance with the second embodiment, taken along line A—A in FIG. 4.
Figure 5B:
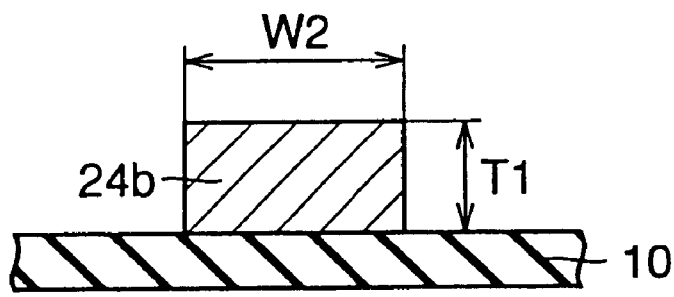
FIG. 5B is a cross sectional view illustrating the structure of interconnection layer 24 in accordance with the second embodiment, taken along line B—B in FIG. 4.
Figure 5C:
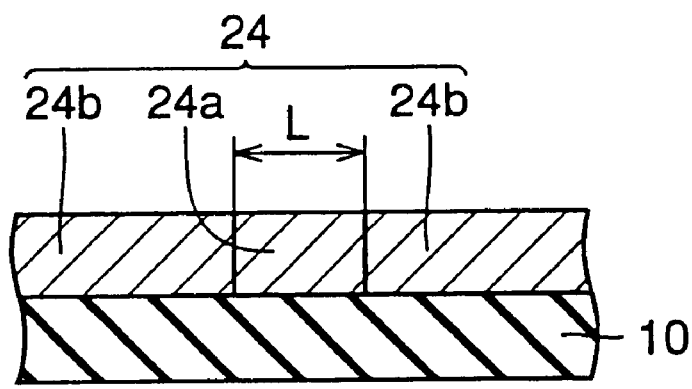
FIG. 5C is a cross sectional view illustrating the structure of interconnection layer 24 in accordance with the second embodiment, taken along line C—C in FIG. 4.

FIG. 5A shows a cross section seen along line A—A in FIG. 4, and FIG. 5B shows a cross section seen along line B—B in FIG. 4. FIG. 5C shows a cross section seen along line C—C in FIG. 4.

Referring to FIG. 5A, meltable portion 24a is formed on printed board 10. The cross section of meltable portion 24a is generally rectangular. The height of meltable portion 24a is T1, and the width thereof is W1. Referring to FIG. 5B, interconnection portion 24b is formed on printed board 10. The cross section of interconnection portion 24b is generally rectangular. The height of interconnection portion 24b is T1 and the width thereof is W2 which is greater than W1. Referring to FIG. 5C, the length of meltable portion 24a is L.

The cross sectional area of meltable portion 24a is smaller than the cross sectional area of interconnection portion 24b. Therefore, when interconnection layer is supplied with current, the density of current passing through interconnection portion 24b is relatively small, and the density of current passing through meltable portion 24a is greater. Accordingly, meltable portion 24a rapidly generates heat when current exceeds a prescribed value. This heat generation melts meltable portion 24a. Interconnection layer 24 is thereby broken.

Smaller cross sectional area (T1×W1) of meltable portion 24a increases the resistance of meltable portion 24a, so that meltable portion 24a can be melted and cut off with a small current. Alternatively, longer length L of meltable portion 24a increases the resistance of meltable portion 24a, so that meltable portion 24a can be melted and cut off with a small current. Therefore, the value of current at which meltable portion 24a is melted and cut off can be set by adjusting the length and cross sectional area of meltable portion 24a. For example, when height T1, width W1 and length L are respectively set to about 35 μm, about 150 μm and 10 mm, meltable portion 24a is melted and cut off at about 7 amperes. When two such interconnection layers are disposed in parallel, meltable portion 24a is melted and cut off at about 14 amperes.

Figure 6:
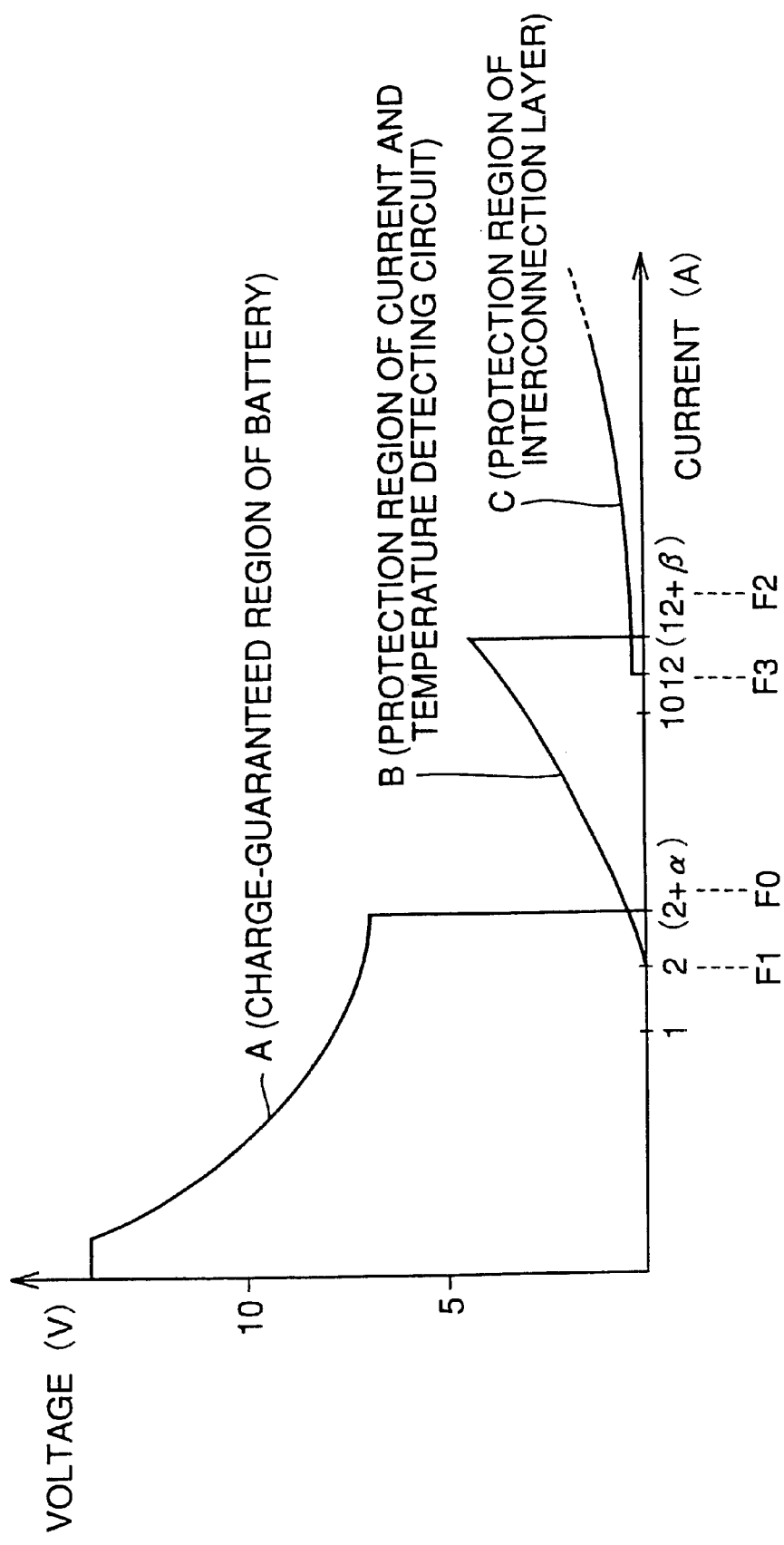
FIG. 6 is a graph illustrating a battery protective function by a current-amount control circuit 50 and interconnection layer 24 in accordance with the second embodiment.

Referring now to FIG. 6, the battery-protecting function by interconnection layer 24 and current-amount control circuit 50 will be described. In FIG. 6, the ordinate and the abscissa respectively represent voltage and current. A represents a charge-guaranteed region in which the battery is rechargeable without damage, and B represents a protection region in which the current and temperature detecting circuit (for example a PTC element, a thermal protector and the like) forming current-amount control circuit 50 can function. Further, C represents a protection region of the interconnection layer.

Charge-guaranteed region A in which the battery is rechargeable without damage ranges from 0 ampere to F0 ampere. In the figure, F0 is about (2+α) amperes.

Protection region B of the current and temperature detecting circuit ranges from the current value F1 to the current value F2, and the current value F1 is included in the boundary region of charge-guaranteed region A. In the figure, F1 is about 2 amperes, and F2 is about (12+β) amperes.

In this case, interconnection layer 24 is formed such that meltable portion 24a is melted when the value of current flowing in the battery becomes equal to or more than F3. Here, the current value F3 is set to a value included in the boundary region of the protection region of the current and temperature detecting circuit. In the figure, F3 is about 12 amperes.

In other words, in the second embodiment, interconnection layer 24 is formed such that the protection region by interconnection layer 24 (the current region in which meltable portion 24a is melted and the interconnection layer is cut off) overlaps the boundary value of the protection region of the current and temperature detecting circuit.

If the current flowing in the battery has a current value within charge-guaranteed region A (0 ampere to F0 ampere), the battery can be charged without damage.

When the value of current flowing in the battery enters protection region B, the current and temperature detecting circuit operates to increase its resistance and decrease the current flowing into the battery. At this point, current-amount control circuit 50 performs its protecting function from the vicinity of the boundary value of charge-guaranteed region A of the battery.

Further, when the value of current flowing in the battery gets close to the boundary value of protection region B, meltable portion 24a is melted, and interconnection layer 24 is cut off, so that the current flowing in current-amount control circuit 50 and battery 20 is interrupted. Therefore, a short between PTC elements due to carbonization of PTC element caused by the current exceeding protection region B can be prevented. Furthermore, the current-limiting effect by PTC element 55 has a time delay, of which effect on battery 20 can also be prevented.

It is noted that in the portion where two regions overlap, for example, in the region where charge-guaranteed region A and protection region B of current and temperature detecting circuit overlap (that portion in which the current value is not less than F1 and not more than F0), charge-guaranteed region A of the battery, which is at the left side of these regions, is designed to function with priority. Further, in the region where protection region B of the current and temperature detecting circuit and protection region C of the interconnection layer overlap (that portion in which the current value is not less than F3 and not more than F2), protection region B of the current and temperature detecting circuit, which is at the left side of these regions, is designed to function with priority.

In this manner, according to the second embodiment, when a short or the like causes heavy current to flow in battery core 21, PTC element 55 can operate to decrease the value of current flowing in battery core 21. In addition, when it comes close to such an environment that is out of the condition ensuring normal operation of PTC element 55 due to charge at an overvoltage, charge in reverse direction or the like, meltable portion 24a is melted and cut off.

Since this can interrupt the current, the undesirably high temperature of battery core 21 can be prevented. In addition, degradation and damage of current-amount control circuit 50 can be prevented. As a result, the overall safety and reliability of the device including the battery can be assured.

Figure 7:
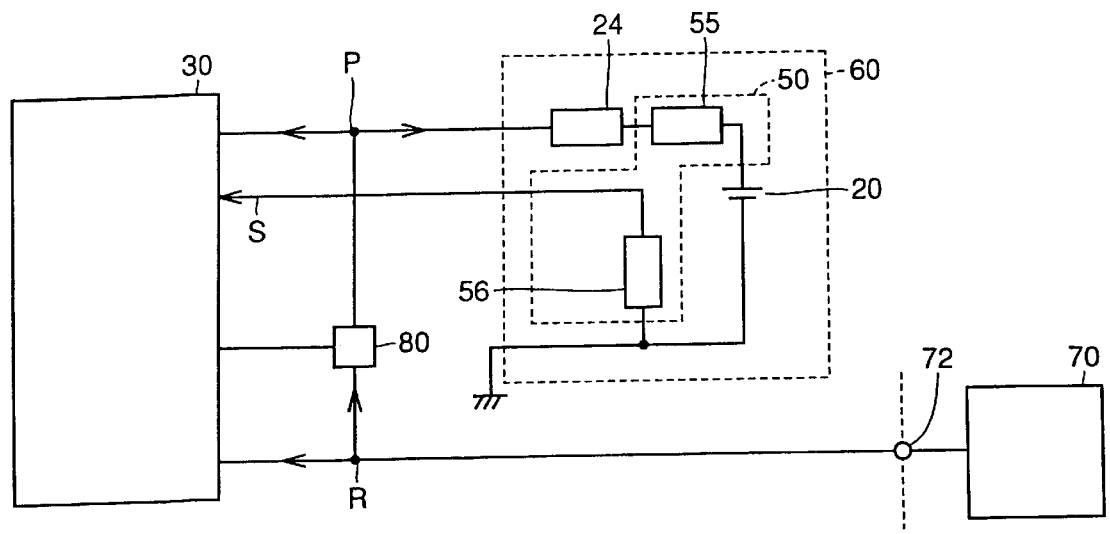
FIG. 7 is a diagram showing an exemplary configuration of the main portion of portable telephone 1 in accordance with the second embodiment.
Figure 8:
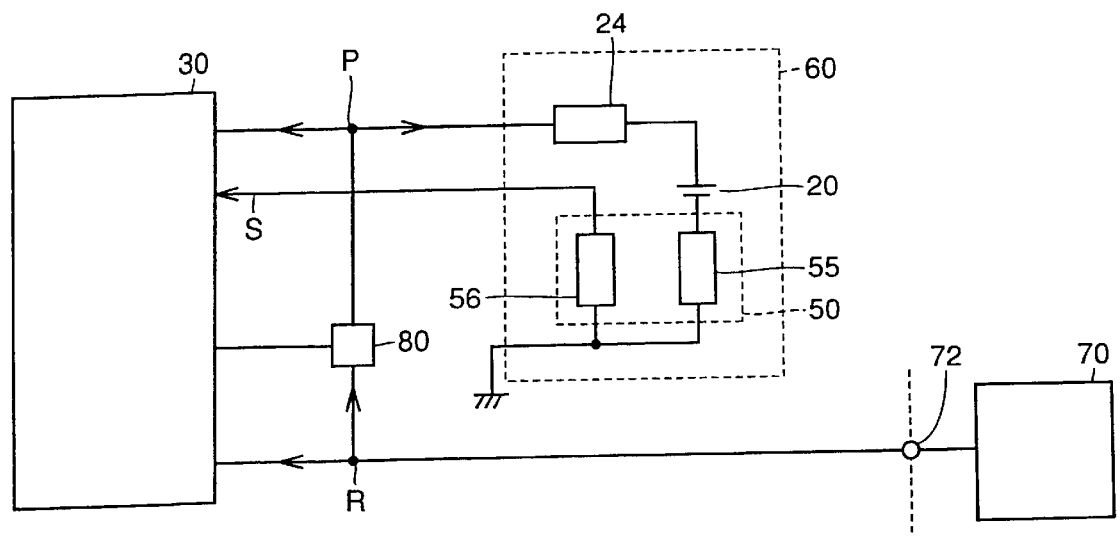
FIG. 8 is a diagram showing an exemplary configuration of the main portion of portable telephone 1 in accordance with the second embodiment.
Figure 9:
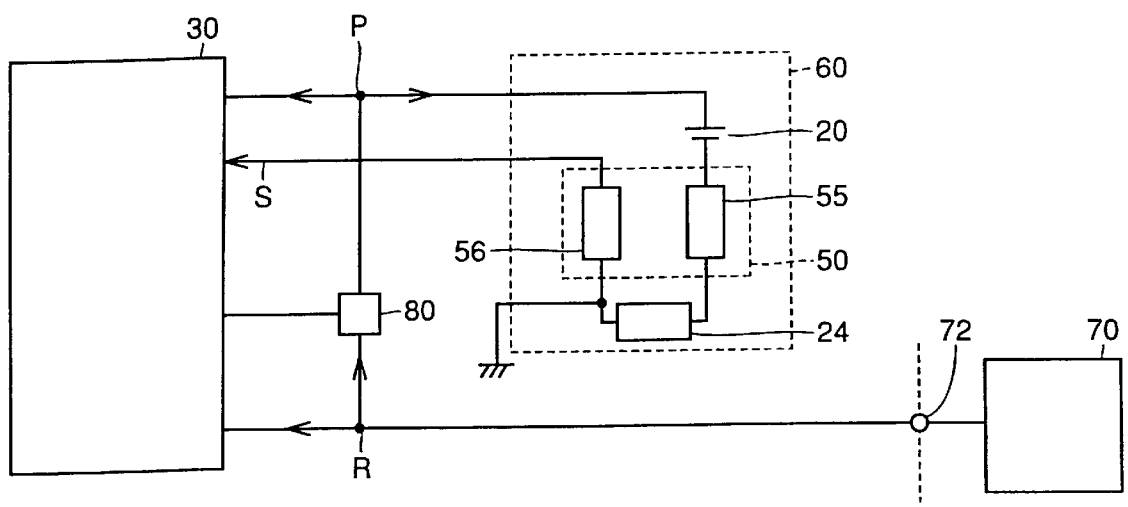
FIG. 9 is a diagram showing an exemplary configuration of the main portion of portable telephone 1 in accordance with the second embodiment.

An example of such a relation between interconnection layer 24 and the current-amount control circuit is as shown in FIGS. 7 to 9. In an example shown in FIG. 7, current-amount control circuit 50 is configured with PTC element 55 and thermistor 56. Interconnection layer 24 and PTC element 55 are connected between the positive terminal of battery 20 and main circuit 30, and thermistor 56 is connected with the side of the negative terminal of battery 20.

In an example shown in FIG. 8, interconnection layer 24 is arranged between main circuit 30 and the positive terminal of battery 20, and PTC element and thermistor 26 configuring current-amount control circuit 50 is connected with the side of the negative terminal of battery 20.

Further, in an example shown in FIG. 9, PTC element 55 and thermistor 26 configuring current-amount control circuit 50 is connected with the side with lower potential. Interconnection layer 24 is connected between PTC element 55 and a ground terminal.

FIGS. 7 to 9 show PTC element 55 and thermistor 56 configuring current-amount control circuit 50, but this invention is not limited thereto.

Figure 10:
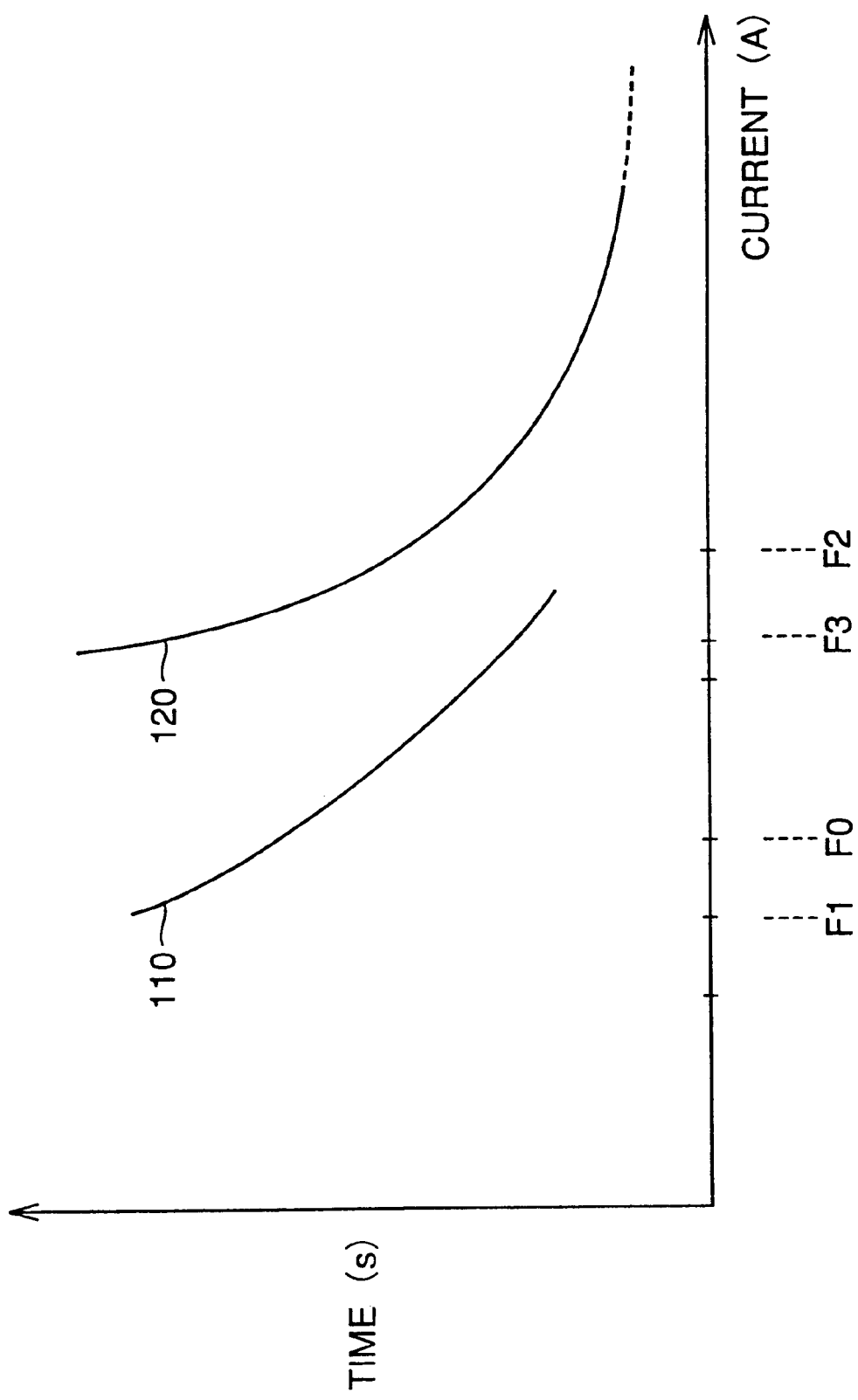
FIG. 10 is a graph showing a relation between the value of current and the time at which each element functions, in a battery protective circuit in accordance with the second embodiment of the present invention.

FIG. 10 is a graph showing the relation between the value of current and the time at which each element may function, in the battery protective circuit in accordance with the second embodiment of the present invention. In FIG. 10, the ordinate shows the time required for each element to start an operation, and the abscissa shows the current value. Curve 110 shows the relation between the time and the value of current at which the current and temperature detecting circuit (such as a PTC element, a thermal protector or the like) configuring current-amount control circuit 50 may operate. Curve 120 shows the relation between the time and the value of current necessary for meltable portion 24a of interconnection layer 24 to be melted and cut off. Referring to FIG. 10, as shown with curve 110, as the value of current flowing in the temperature detecting circuit (such as a PTC element, a thermal protector or the like) becomes greater, the time required for current-amount control circuit 50 to start an operation becomes shorter. Similarly, as shown with curve 120, as the value of current flowing in interconnection layer 24 becomes greater, the time required for meltable portion 24a to start melting and cutting off becomes shorter. Both of curve 110 and curve 120 are convex downward, which shows that the corresponding element takes shorter time to operate as the current value becomes greater.

The protection region of the current and temperature detecting circuit ranges from the current value F1 to the current value F2, and the current value F1 is included in the boundary region of the charge-guaranteed region.

In this case, for interconnection layer 24, meltable portion 24a is melted when the value of current flowing in the battery reaches equal to or more than F3. Here, the current value F3 is set to be a value which is included in the boundary region of the protection region of the current and temperature detecting circuit.

Figure 11:
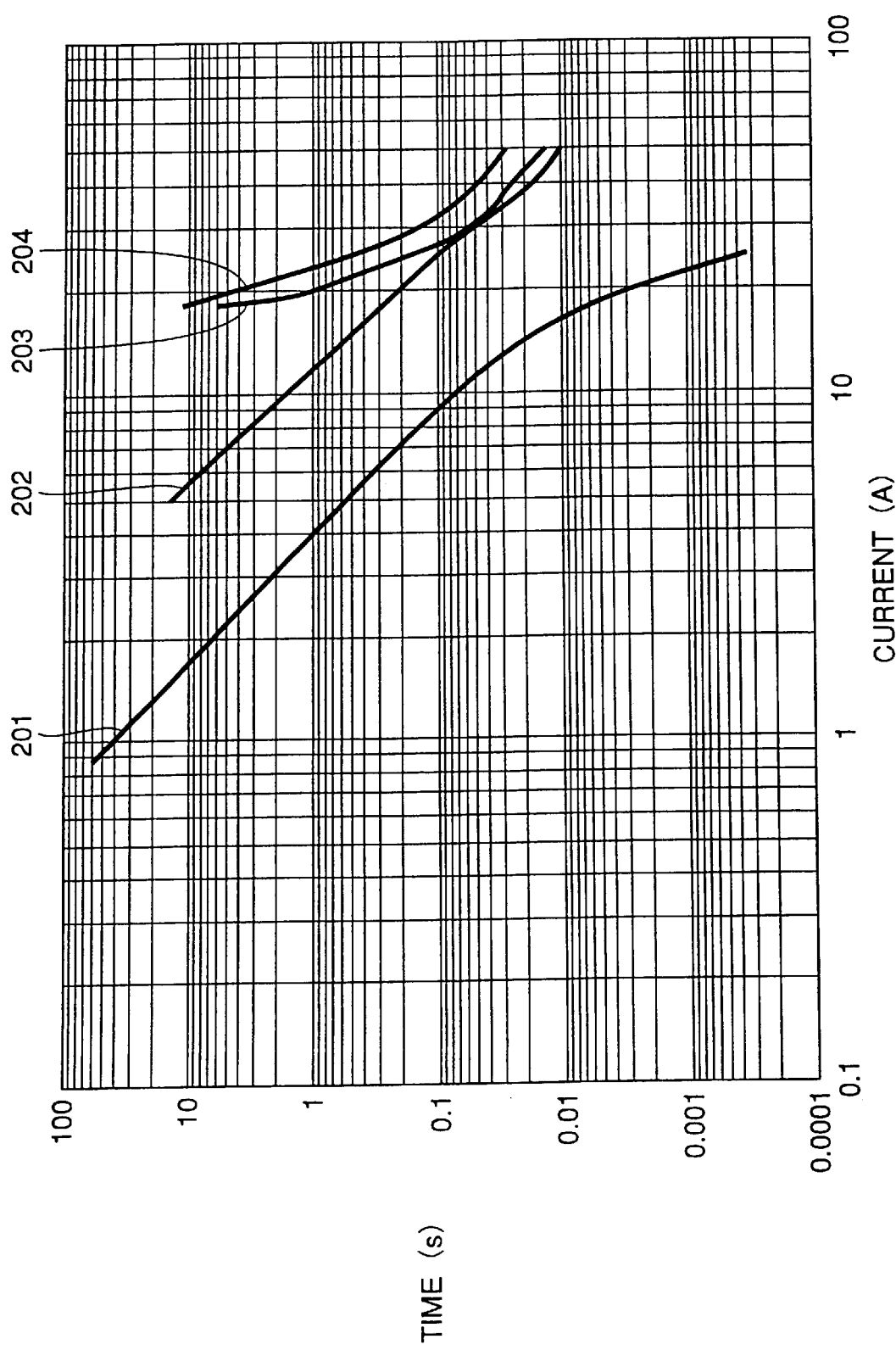
FIG. 11 is a graph showing a specific relation between the value of current and the time at which each element functions, in a battery protective circuit in accordance with the second embodiment of the present invention.
Figure 12:
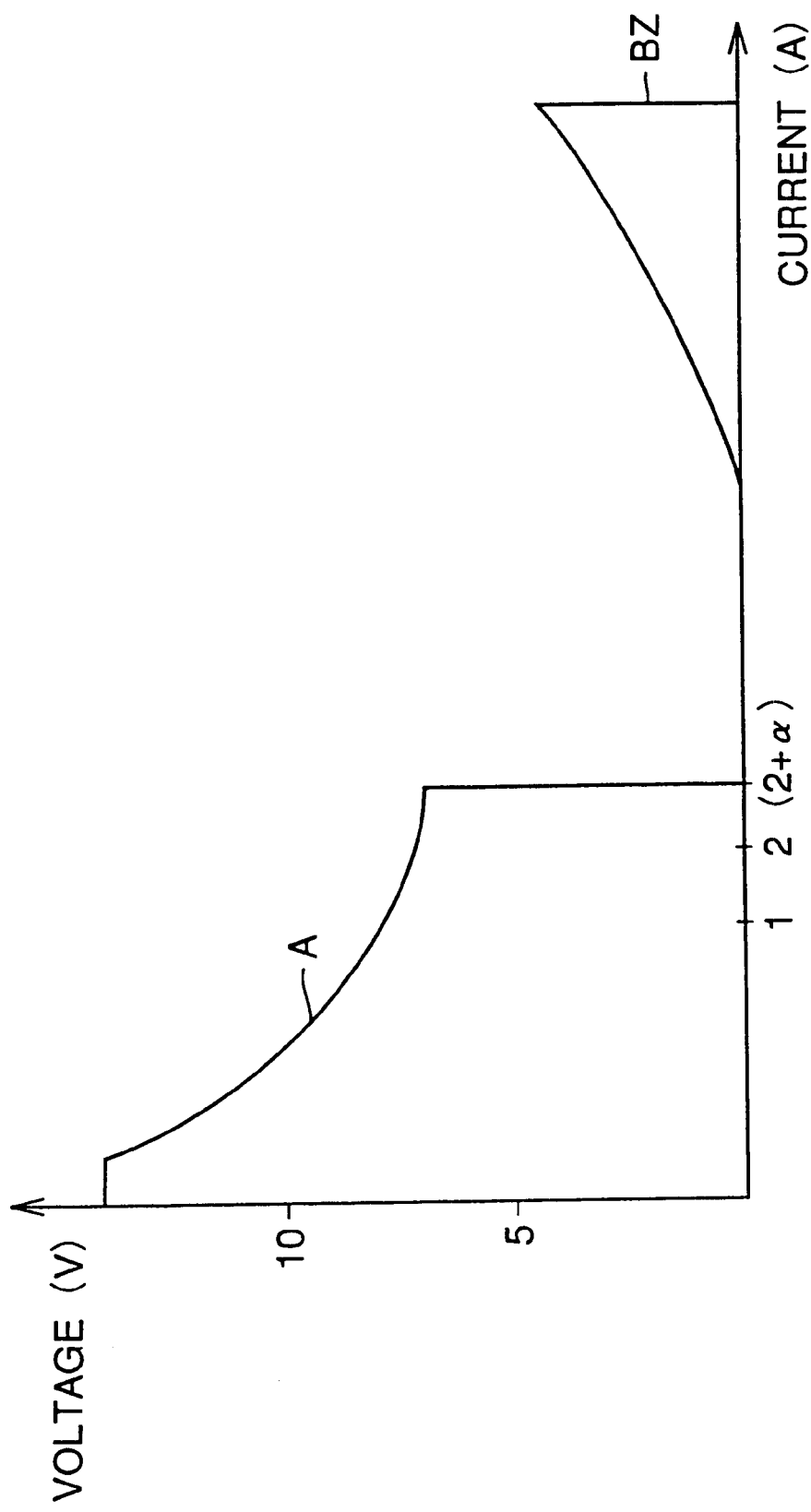
FIG. 12 is a graph illustrating a problem in a conventional battery protective circuit.

Next, three interconnection layers 24 were prepared, with 0.2 mm of the width W1, 35 μm of thickness T1, and 10 mm of the length of meltable portion 24a shown in FIG. 5A. These were connected in parallel, and in this interconnection layer, the time and the value of current at which the meltable portion began melting were measured in a high temperature atmosphere and a low temperature atmosphere. Further, the time and the value of current at which PTC began operating were measured in a high temperature atmosphere and a low temperature atmosphere. The result is shown in FIG. 11. In FIG. 11, the ordinate shows the time required for each element to start an operation, and the abscissa shows the current value. Curve 201 shows the relation between the time and the value of current necessary for PTC to operate in the high temperature atmosphere. Curve 202 shows the relation between the time and the value of current necessary for PTC to operate in the low temperature atmosphere. Curve 203 shows the relation between the time and the value of current necessary for meltable portion 24a to be melted and cut off in the high temperature atmosphere. Curve 204 shows the relation between the time and the value of current necessary for meltable portion 24a to be melted and cut off. As can be seen from FIG. 11, in the interconnection layer in accordance with this invention, as the value of current at which meltable portion 24a is melted and cut off becomes greater, the time required for meltable portion 24a to start melting and cutting off becomes shorter. In addition, it can be seen that meltable portion 24a is melted and cut off in a shorter time in the high temperature atmosphere compared with in the low temperature atmosphere.

For the protective circuit in accordance with the present invention, an external short (so called chain-short) with not more than 50 mΩ of resistance value and about one second of the duration may not melt and cut off meltable portion 24a, and therefore the battery can be reused.

Although the first and second embodiments have been described above, various modifications may be made on the embodiments described herein.

Although a portable telephone is taken as an example of a personal digital assistant, the present invention is not limited thereto, and may be applied to a notebook-sized personal computer, a video tape recorder and the like.

Any of a lithium cell, a nickel-cadmium battery and a polymer battery may be used as battery 20.

The relation between PTC element 55 and thermistor 56 and interconnection layer 24 which are arranged for the positive terminal 22 and the negative terminal 23 of the battery is not limited to the one described above.

Various kinds of material can be used rather than copper and the like, as a material of interconnection layer 24. More specifically, interconnection portion 24b may be formed of a material with higher melting point and meltable portion 24a may be formed of a material with lower melting point.

Further, the number of interconnection layers 24 is not limited to one, but may be changed properly as needed. In case where a plurality of interconnection layers 24 are provided, any one of meltable portion 24a is surely melted, and therefore the reliability of the device is further improved.

Still further, the shape of the meltable portion in the interconnection layer is not limited to the linear shape as shown. The meltable portion may be formed, for example, to extend in a serpentine shape in order to secure the length.

In accordance with the present invention, even when the value of current flowing into the battery increases, the value of current can be decreased before degradation and damage of the battery. As a result, the battery can surely be protected, and the reliability and safety of the battery and the device operated by the battery can be improved.

In accordance with the present invention, the current amount approaches the boundary region of the operating condition of the current and temperature detecting circuit, due to overcharge, charge in reverse direction or the like, the interconnection layer is melted and cut off at the time when the current-amount control circuit is not yet damaged, and the current is interrupted.

Therefore, the undesirably high temperature of the battery can be prevented, and in addition, the current-amount control circuit may not be burdened. As a result, the reliability and safety of the battery and the device operated by the battery can be improved.

In addition, in accordance with the present invention, a plurality of the interconnection layers having meltable portions may be provided, so that current can be interrupted at respective different positions when it enters the protection region of the interconnection layer. In particular, when the identical interconnection layers are provided in parallel, the reliability can be enhanced.

Although the present invention has been described and illustrated in detail, it is clearly understood that the same is by way of illustration and example only and is not to be taken by way of limitation, the spirit and scope of the present invention being limited only by the terms of the appended claims.

Industrial Applicability

A battery protective circuit in accordance with the present invention can be applied to a portable telephone, a notebook-sized personal computer, a word processor, a liquid crystal television, a VTR with camera and the like.

What is claimed is:
1. A battery protective circuit comprising a current-amount control circuit having a current and temperature detecting circuit operative to detect a value of current flowing in a rechargeable battery including a battery core as a power generating element and an electrode terminal electrically connected to the battery core, and to decrease said value of current when said value of current and an ambient temperature of said battery reaches a value in a protection region, wherein a minimum current value in the protection region of said current and temperature detecting circuit is less than a maximum current value in a charge-guaranteed region in which said battery is rechargeable without damage and said battery can protect itself, and a maximum current value in said protection region is greater than the maximum current value in said charge-guaranteed region.

2. A battery protective circuit comprising a current-amount control circuit having a current and temperature detecting circuit operative to detect a value of current flowing in a rechargeable battery including a battery core as a power generating element and an electrode terminal electrically connected to the battery core, and to decrease said value of current when said value of current and an ambient temperature of said battery reaches a value in a first protection region, further comprising an interconnection layer including a meltable portion to be melted and cut off when a value of current flowing in said battery reaches a value in a second protection region, a cross sectional area of said meltable portion being relatively smaller than a cross sectional area excluding said meltable portion, wherein a minimum current value in a first protection region of said current and temperature detecting circuit is less than a maximum current value in a charge-guaranteed region in which said battery is rechargeable without damage and said battery can protect itself, and a maximum current value in said first protection region is greater than the maximum current value in said charge-guaranteed region, and a minimum current value in said second protection region is less than the maximum current value in said first protection region, and the minimum current value in said second protection region is greater than the maximum current value in said charge-guaranteed region.

3. The battery protective circuit according to claim 2, wherein at least two meltable portions of said interconnection layer are arranged.

* * * * *